(12) United States Patent
De Aldecoa Bueno

(10) Patent No.: US 10,694,760 B1
(45) Date of Patent: Jun. 30, 2020

(54) SYSTEM FOR PRODUCING COLD BREW COFFEE

(71) Applicant: Carlos De Aldecoa Bueno, Houston, TX (US)

(72) Inventor: Carlos De Aldecoa Bueno, Houston, TX (US)

( * ) Notice: Subject to any disclaimer, the term of this patent is extended or adjusted under 35 U.S.C. 154(b) by 0 days.

(21) Appl. No.: 16/401,444

(22) Filed: May 2, 2019

Related U.S. Application Data

(62) Division of application No. 15/376,112, filed on Dec. 12, 2016, now Pat. No. 10,306,904.

(51) Int. Cl.
*A47J 31/46* (2006.01)
*A23F 5/26* (2006.01)

(52) U.S. Cl.
CPC ............. *A23F 5/26* (2013.01); *A47J 31/467* (2013.01)

(58) Field of Classification Search
CPC .................................. A23F 5/26; A47J 31/467
See application file for complete search history.

(56) References Cited

U.S. PATENT DOCUMENTS

| | | | | |
|---|---|---|---|---|
| 2,931,727 A | * | 4/1960 | Kraut | A23F 5/267 426/432 |
| 2,931,728 A | * | 4/1960 | Franck | A23F 5/267 426/432 |
| 3,700,466 A | * | 10/1972 | Franck et al. | A23F 5/262 426/594 |
| 9,480,359 B1 | * | 11/2016 | Kalenian | A23F 5/262 |
| 10,306,904 B1 | * | 6/2019 | De Aldecoa Bueno | A23F 5/26 |
| 2016/0270416 A1 | * | 9/2016 | Corey | B01D 11/02 |
| 2019/0053511 A1 | * | 2/2019 | Gelov | A23F 5/246 |

\* cited by examiner

*Primary Examiner* — Anthony J Weier
(74) *Attorney, Agent, or Firm* — Egbert, McDaniel & Swartz, PLLC

(57) ABSTRACT

A system and a process for producing cold brew coffee are provided. The system and method include the use of an extraction tank adapted to receive ground coffee beans therein. Water is pumped into the extraction tank. A back pressure control valve is provided so as to pulse the back pressure within the tank. This pulsed back pressure increases turbulence within the tank. Combined with the flow rate and pressure within the tank, the turbulence allows for cold brewed coffee concentrate to be produced in a much quicker time than associated with prior art methods. A number of extraction tanks may be provided in the system of the present invention so as to increase yield.

4 Claims, 4 Drawing Sheets

US 10,694,760 B1

SYSTEM FOR PRODUCING COLD BREW COFFEE

CROSS-REFERENCE TO RELATED APPLICATIONS

The present application is a division of U.S. application Ser. No. 15/376,112, filed on Dec. 12, 2016, now U.S. Pat. No. 10,306,904, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the production of cold brew coffee. More particularly, the present invention relates to a system and process for the production of cold brew coffee providing accelerated extraction times.

2. Description of Related Art Including Information Disclosed Under 37 CFR 1.97 and 37 CFR 1.98

Apparatuses for brewing coffee are well known in the prior art. Most commonly and traditionally, heated water is poured over ground coffee beans. Coffee extract resulting from the mixture of hot water and coffee grounds drips through a filter into the coffee pot or other vessel. This is the most common way that coffee is brewed.

In recent years, consumers have taken a greater interest in coffee and also the different methods of brewing coffee. These new or different methods range from the more complex and time-consuming methods, but also include apparatuses such as a Keurig® machine which provides for the quick brewing of a single cup of coffee. As noted above, coffee is typically brewed in hot or boiling water. However, it is also possible to cold brew coffee. Consumers are taking a greater interest in cold brewed coffee for a number of reasons. Cold brewing coffee extracts the flavor of the coffee beans, but leaves behind bitter compounds and fatty oils, which means that there is significantly less acid (approximately 50 to 67% less) than coffee brewed using conventional hot water methods. This is because many of the bitter oils and acids in the coffee are only soluble high temperature, and as such coffee brewed using the hot water methods contain these bitter oils and acids. The cold brew coffee thus has a different flavor profile than coffee brewed using the conventional hot water methods, and many consumers prefer the less bitter coffee produced.

Cold brew coffee is also very easy to use in iced coffee drinks, but may also be heated. Typically, the extract concentration using the conventional cold brew process is approximately 2.5% TDS (total dissolved solids), such that the 1 part cold brew coffee concentration is often mixed with 1 to 2 parts water to produce a typical cup of coffee.

Consumer interest in cold brewed coffee has led to the development of numerous apparatuses for home cold brewing of coffee. For example, U.S. Patent Publication No. 2012/0021108, published on Jan. 26, 2012 to Baumann et al., describes such a cold brew apparatus. The apparatus of the Baumann publication is essentially a bag in which ground coffee is deposited or stored. An opening in the bag is provided so as to allow water to be added to the coffee grounds or other brewable ingredients. The opening is then covered so as to allow the cold brewing to take place over the time of approximately 8 to 24 hours. After this time, the coffee extract (cold brew) can then be poured out of the brewing bag.

U.S. Pat. No. 8,720,321, issued on May 13, 2014 to Neace, discloses another apparatus for cold brewed coffee. The apparatus of the Neace patent is an hourglass-shaped apparatus that can be used to brew, store and dispensed the cold brew coffee. Water is poured in one end of the apparatus to allow for the cold brew process to take place. After the brewing process, the apparatus can be inverted such that the coffee can be stored and then dispensed.

FIG. 1 shows a prior art cold brewing system 10 as commonly used today. The cold brew system 10 of the prior art includes a tank 12 wherein a basket 14 is disposed. The basket 14 contains ground coffee beans 18. The ground coffee beans 18 within the basket 14 are submerged in the water 16 in the tank 12. The water within the tank 12 is usually at room temperature, and the process requires between 16 and 20 hours for an acceptable level of extraction to take place.

After extraction has taken place, coffee extract is a drained through the drain valve 20 for further processing or packaging. The spent coffee grounds 18 must be removed from the basket 14 by use of a hoist and must be dumped into a tote. The extract concentration using this conventional process is approximately 2.5% TDS. For reference, a cup of coffee typically contains 1% TDS. The final TDS of the extract/concentration can be modified by adjusting the water to coffee ratios.

This prior art method as shown in FIG. 1 has numerous drawbacks, the primary drawback being the length of time it takes for acceptable extraction to take place. Due to the great length of time it takes, it can be difficult for coffee producers or coffee shops to have an adequate supply of cold brew concentrate on hand. For example, it is relatively common for a Starbucks® coffee shop to run out of cold brewed coffee concentrate during the day. Additionally, the cold brew system of the prior art is an open system which gives rise to numerous issues related to food safety. The open system 10 of the prior art must be chemically sanitized between brewing processes. As can be appreciated, this chemical sanitation is time-consuming and costly. As such, production of cold brew coffee concentrate on a commercial scale is difficult and can be economically untenable.

Various patents have issued and been applied for in the past relating to commercial cold brew processes. For example, U.S. Patent Publication No. 2015/0015204, published on Jan. 21, 2016 to Belanich et al., describes an apparatus and method for cold brewing coffee. The apparatus of the Belanich publication includes a filter insert, a filter frame receiving the filter insert therein and a barrel receiving the filter frame and the filter insert, wherein the filter insert has a stainless steel mesh cylindrical side wall and a stainless steel mesh flat bottom perpendicular to the side wall. The filter frame has a perforated cylindrical side wall and a perforated flat bottom, wherein the perforated cylindrical side wall is arranged coaxially with the stainless steel mesh cylindrical side wall of the filter insert.

U.S. Pat. No. 8,586,117, issued on Nov. 19, 2013 to the Vastardis et al., discloses a liquid infusion process and method of brewing a beverage. The process of the Vastardis patent utilizes a reduced-pressure cycle and vacuum so as to extract coffee materials from the ground coffee.

It is an object of the present invention to provide a cold brew coffee process and system which allows for the production of cold brew coffee on a commercial scale.

It is another object of the present invention to provide a cold brew process and system which can extract the coffee concentrate much more quickly than the conventional processes.

It is another object of the present invention to provide a cold brew process and system which provides for a higher concentration of coffee extract than prior art methods and systems.

It is yet another object of the present invention to provide a cold brew coffee process and system which results in a greater coefficient of extraction of the coffee grounds.

It is another object of the present invention to provide a cold brew process and system which provides for greater uniformity of product as compared to the prior art.

It is yet another object of the present invention to provide a cold brew coffee process and system where cold brew coffee is produced in sanitary conditions.

It is yet another object of the present invention to provide a cold brew coffee process and system which maintains the desirable taste profile associated with cold brew coffee.

These and other objects and advantages of the present invention will become apparent from a reading of the attached specification and appended claims.

BRIEF SUMMARY OF THE INVENTION

The present invention is a system for producing cold brew coffee. The system includes an extraction tank having an interior volume adapted to receive ground coffee beans therein. A ground coffee inlet is provided which opens to the interior volume of the extraction tank so as to allow ground coffee beans to be introduced into the interior volume. The ground coffee inlet preferably opens adjacent an upper end of the extraction tank. A water inlet is provided which communicates with the interior volume of the extraction tank. The water inlet is adapted to allow water to flow into the interior volume of the extraction tank. The water inlet preferably opens adjacent a lower end of the extraction tank. A coffee outlet is provided which communicates with the interior volume of the extraction tank. The coffee outlet opens adjacent the upper end of the extraction tank. A pump is provided which cooperates with the water inlet so as to pump water under pressure through the water inlet such that the water flows upwardly through the coffee in the extraction tank. A back pressure control valve is provided which is in cooperation with the coffee outlet so as to control water pressure within the extraction tank.

In the present invention, a coffee collection tank is preferably connected to the coffee outlet so as to collect coffee extract from the extraction tank. A first filter is preferably connected to the water inlet so as to prevent the ground coffee from entering the water inlet, and a second filter is connected to the coffee outlet so as to prevent ground coffee from exiting the extraction tank. Preferably, the first filter is a first filter bayonet and the second filter is a second filter bayonet. Each of these filter bayonets preferably comprise wedge wire having a wide end and a narrow end.

In the system of the present invention present, the extraction tank preferably has a height to diameter ratio of approximately 7.5. A steam outlet valve may be positioned adjacent the top of the extraction tank. Further, a loading valve may be provided on the top of the extraction tank and an unloading valve provided on the bottom of the extraction tank.

The present invention is also an extraction system for cold brew coffee. The extraction system includes a plurality of extraction tanks connected in series. Each of the plurality of extraction tanks has an interior volume adapted to receive ground coffee beans therein and a back pressure control valve connected thereto. The back pressure control valve is adapted to control water pressure in the respective extraction tank. A water tank is also provided and a pump is connected to the water tank and to the plurality of extraction tanks.

In the system of the present invention, the plurality of extraction tanks may include a first set of extraction tanks connected in series, and a second set of extraction tanks connected in series. The pump is connected to the first set of extraction tanks and another pump may be connected to the second set of extraction tanks. Each of the plurality of extraction tanks may include a loading valve on a top thereof and unloading valve the bottom thereof. Further, a first filter may be positioned in an inlet of the extraction tank and a second filter may be positioned in an outlet of the extraction tank. The first filter and second filter may be filter bayonets having wedge wire with a wide end and a narrow end. In one embodiment of the present invention, the wide end of the wedge wire of the first filter bayonet may face outwardly of the first filter bayonet into the extraction tank, and the wide end of the wedge wire of the second filter bayonet may face inwardly of the second filter bayonet. Preferably, the plurality of extraction tanks has a height to diameter ratio approximately 7.5.

The present invention is also a process for producing cold brew coffee extract. The process includes a steps of: providing at least one extraction tank having interior volume; loading ground coffee beans into the interior volume of at least one extraction tank; pumping water into the extraction tank through bottom inlet thereof; pulsing a back pressure within the at least one extraction tank to provide increased turbulence within the extraction tank; and discharging water and coffee extract from the outlet of the at least one extraction tank.

In the process of the present invention, the at least one extraction tank may include a plurality of extraction tanks connected in series. The step of the discharging may include moving the water and coffee extract to another extraction tank of the plurality of extraction tanks so as to increase the coffee concentration in the discharged water and coffee extract.

In the process of the present invention, the step of pulsing includes pulsing the back pressure between 50 and 100 p.s.i.g. such that the pressure within the extraction tank rages between 100 and 200 p.s.i.g. The flow rate of the pump water is preferably maintained during step of pulsing.

The step of pumping may include pumping the water into the extraction tank at a flow rate of between 2 and 5 gallons per minute. In the process of the present invention, there is provided a step of forming an extraction tank having a height to diameter ratio of approximately 7.5.

This foregoing Section is intended to describe, in generality, the preferred embodiments of the present invention. It is understood that modifications to these preferred embodiments can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
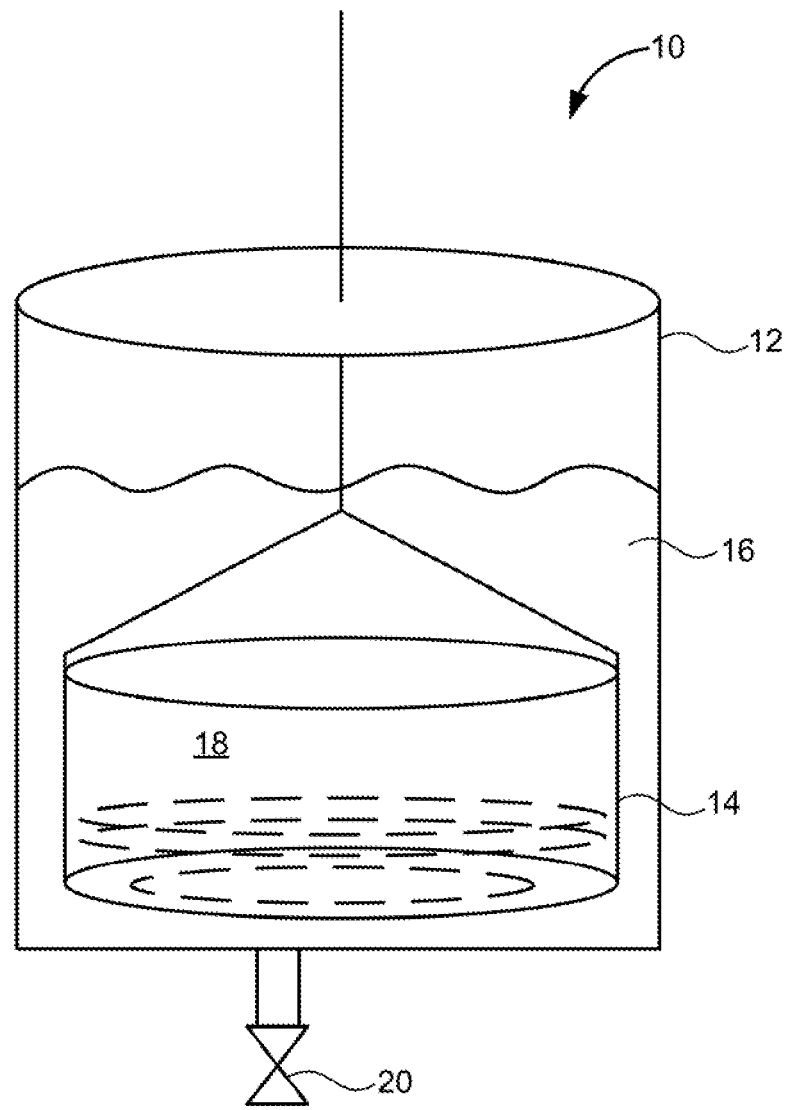
FIG. 1 illustrates a prior art cold brewing system and method.
Figure 2:
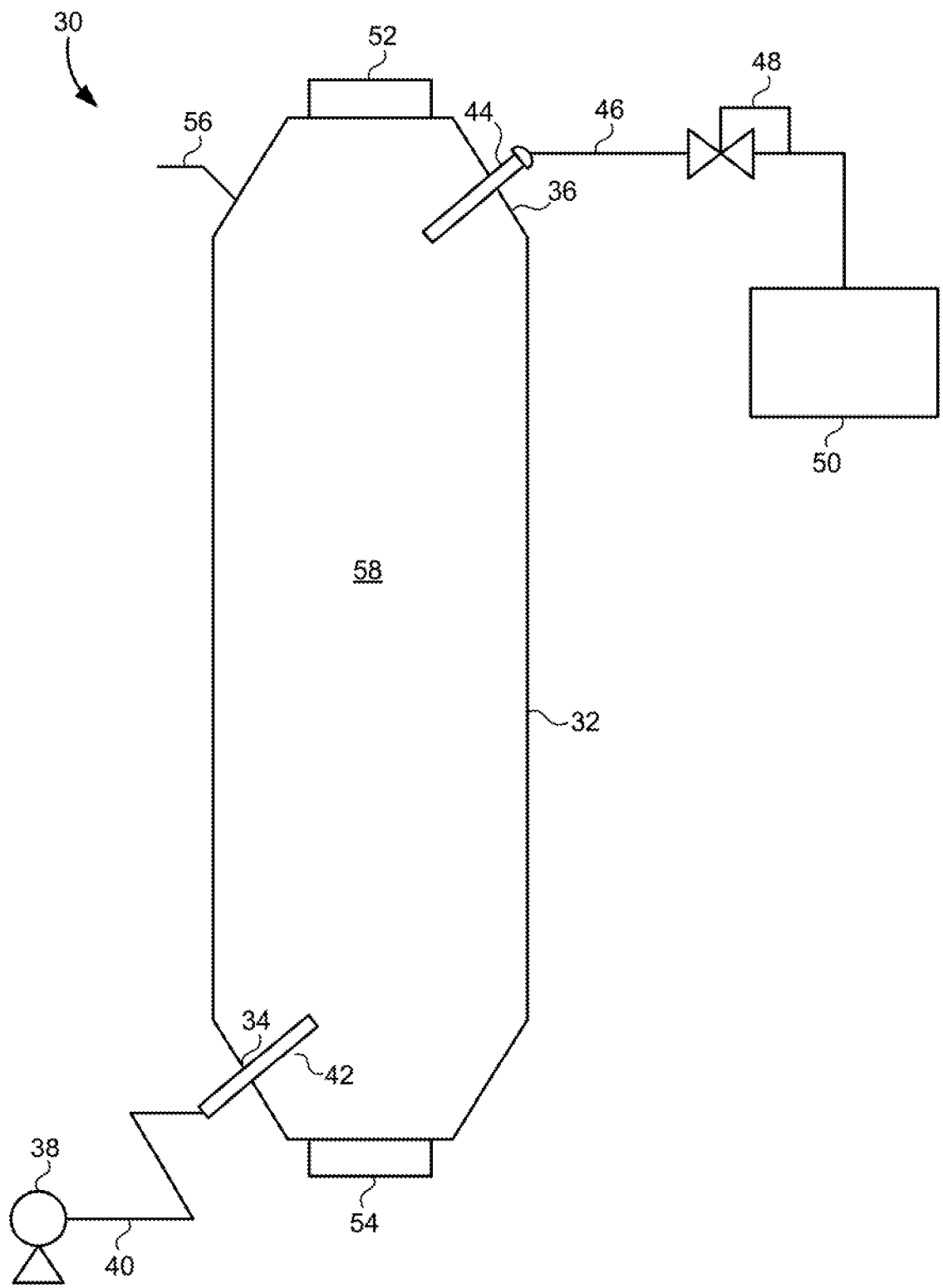
FIG. 2 shows a schematic view of the cold brew system and process of the present invention.

Referring to FIG. 2, there is shown a side view of the extraction system for cold brew coffee 30 of the preferred embodiment of the present invention. The system 30 of the present invention includes an extraction tank 32. The extraction tank 32 is preferably approximately 24 inches in diameter and 15 feet tall, thus having a height to diameter ratio of 7.5. This ideal ratio (and approximates thereof) allows for high fluid velocity and increased turbulence within the extraction tank 32, which, as will be discussed hereinbelow, leads to greater extraction efficiency.

The extraction tank 32 includes a water inlet 34 adjacent a bottom of the extraction tank 32 and a coffee outlet 36 adjacent a top of the extraction tank 32. A pump 38 is connected through a water line 40 to the first filter 42 positioned in the water inlet 34. As will be discussed hereinbelow, the first filter 42 is preferably a filter bayonet utilizing a wedge wire filter.

A second filter 44 is positioned in the coffee outlet 36 adjacent the top of the extraction tank 32. The second filter 44 is preferably a filter bayonet utilizing a wedge wire filter. The second filter 44 is connected via line 46 to a coffee extraction tank 50. Along the line 46, importantly there is provided a back pressure control valve 48.

To produce coffee extract using the system 30 of the present invention, ground coffee is loaded into the extraction tank 32 through the loading valve 52. Preferably, the loading valve 52 is a 6 inch butterfly valve. Typically between 200 and 500 pounds of ground coffee beans are loaded into the extraction tank 32, depending on the desired coffee extract concentration, coffee type and flavor profile desired. Once the ground coffee the loaded into the interior volume 58 of extraction tank 32, water is pumped via the pump 38 through the first filter 42 into the interior volume 58 of the extraction tank 32. The pump 38 is preferably a high-pressure, multistage pump. The flow rate provided by the pump is approximately 2 to 5 gallons per minute, and a temperature of approximately 70° F. is maintained. The extraction process operates at a pressure range between 100 and 200 p.s.i.g.

Back pressure within the extraction tank 32 is controlled by the back pressure control valve 48. The back pressure is pulsed utilizing the back pressure control valve 48 between 50 and 100 p.s.i.g. such that the pressure within the extraction tank rages between 100 and 200 p.s.i.g. This allows for increased turbulence within the extraction tank while keeping the flow rate of 2 to 5 gallons per minute constant. Various trials were conducted by the applicant to arrive at the indicated temperature, flowrate and pressure ranges. The extraction process within the system 30 of the present invention provides an ideal and acceptable level of extraction in approximately 45 minutes as compared to the 18 hours required in the conventional process.

Coffee extract and water is pumped through the second filter bayonet 44 and collected in the coffee collection tank 50. Alternately, as will be described hereinbelow, the coffee extract from the extraction tank 32 can be pumped to a second extraction tank for further processing and greater concentration.

FIG. 2 also shows how the extraction tank 32 may have a steam discharge valve 56. Once the spent coffee grounds are unloaded from the extraction tank 32 through the discharge valve 54, the interior volume 58 of extraction tank 32 can be cleaned using high-pressure steam introduced at the water inlet 34 or at another location. The steam sanitizes the interior of the extraction tank 32 and the steam can then be discharge through the steam discharge valve 56 at the top end of the extraction tank 32. This provides for much easier cleaning and sanitation of the system 30 of the present invention as compared to the chemical sanitation of the conventional cold brewing tanks.

Additionally, the loading valve 52 and discharge valve 54 of the system 30 of the present invention allow for easy loading and unloading of the coffee grounds thus decreasing time between brewing or extraction sessions. In the present invention, the offloading of the spent coffee grounds does not require any manual handling of the coffee grounds and typically takes less than one minute.

Figure 3:
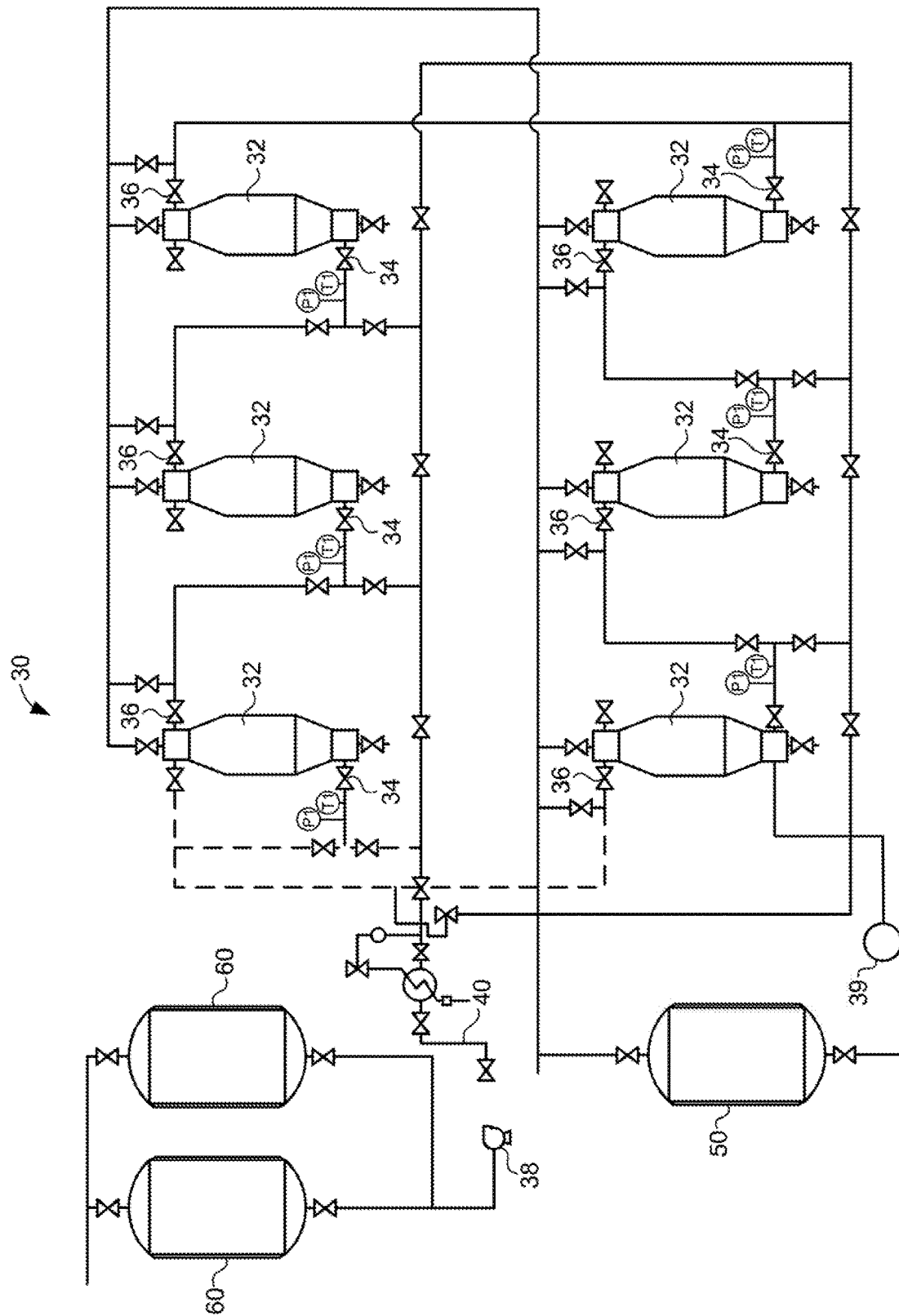
FIG. 3 shows another schematic view of the cold brew system and process of the present invention utilizing a plurality of extraction tanks.

FIG. 3 shows a preferred embodiment of the system 30 of the present invention. In the preferred embodiment of the system 30, there are provided a plurality of extraction tanks 32. As can be seen in FIG. 3, there are preferably a total of six extraction tanks or columns 32 connected in series. FIG. 3 also shows several water tanks 60 which are connected to the pump 38. The water tanks 60 provide filtered water to be pumped into the various extraction tanks 32. These six extraction tanks can be connected in series or the connection between the tanks varied such that there are, for example, two sets of three extraction tanks 32 connected in series. In this instance, a second pump 39 can be provided so as to operate three of the extraction tanks 32. The operating pressure range within the extraction tank 32 is between full vacuum and 300 p.s.i.g. This six extraction tank setup provides flexibility, allowing the operator to run each extraction tank independently or in series (i.e., flow from one feeding the next tank). Different arrangements provide different flavor profiles and yield recoveries. The system as shown in FIG. 3 can be operated easily by a single worker, who can unload and reload an extraction tank while the next or another of the extraction tanks is being operated. As can be appreciated, the system can provide much greater yield and minimal time and labor expense as compared with prior art systems. Use of the system of the present invention in a six extraction tank setup allows for up to 6000 gallons per day of coffee concentrate be produced by a single worker per shift.

The combination of pressure and turbulence due to the flow through the column (as opposed to static in conventional processes) provides for an accelerated extraction system with higher yields, while maintaining the taste profile of the conventional 18 hour steeping. The yield (or coffee to water ratio) provided by the present invention is up to 5% per run versus 2.5% for conventional cold brew methods.

The unique pulsing of the back pressure flow through the system of the present invention allows for a greater extraction coefficient. The periods of increased pressure allows for extraction of oils located in the center of the coffee particle, which would not be extracted utilizing conventional methods. The fluid velocity through the extraction tank provides for a more complete extraction of various coffee particles utilizing clean water. The process of the present invention allows for better uniformity product, and every particle is being extracted within the tank. The sealed system with back pressure also prevents entrapped air or voids within the coffee grounds as compared to prior art. This contributes to the greater extraction coefficient of the present invention.

Although illustrated in the figures as an up-flow system, it is within the concept of the present invention to utilize a down-flow configuration. The down-flow configuration can be achieved by manipulating valves so as to direct the pumped water to the top of the extraction tank(s). This flexibility provides significant advantages over prior art systems.

Figure 4:
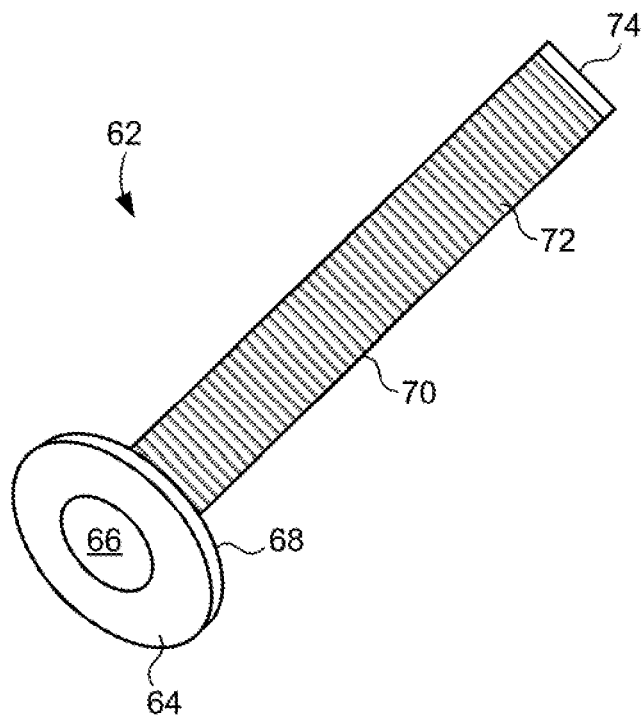
FIG. 4 shows a perspective view of a filter bayonet as used in preferred embodiments of the cold brew system and process of the present invention.

Referring to FIG. 4, there is shown an isolated view of the filter bayonet 62 as utilized in a preferred embodiment the present invention. The filter bayonet 62 is illustrative of both the first filter 42 and the second filter 44 within the extraction tank 32. The filter bayonet 62 has a base 64 having a generally washer-like configuration. The base 64 has an opening 66 into the tubular filter portion 70. The back surface 68 of the base 64 abuts the exterior of the extraction tank 32. The tubular filter portion 70 comprises a wedge wire filter, which allows for reduced plugging and back pressure. This tubular filter portion 70 keeps the ground coffee beans in the extraction tank 32. The filter bayonet 62 has a capped end 74 opposite the base 64. A plurality of slots 72 through the wedge wire on the tubular filter portion are shown. The design of the filter bayonet 62 is different in the orientation of the wedge wire between the first filter 42 in the second filter 44.

Figure 5:
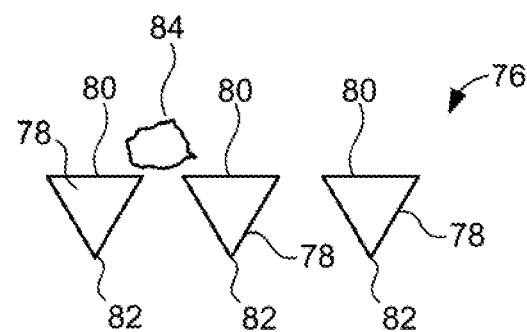
FIG. 5 shows a cross-sectional view of the wedge wire as used in the filter bayonet of the preferred embodiment of the present invention.
Figure 5A:
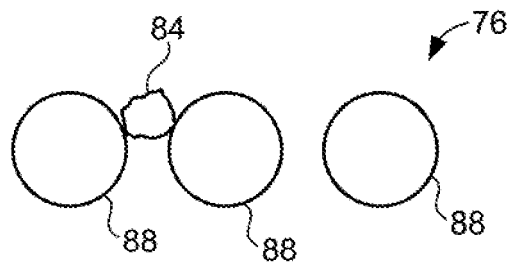
FIG. 5A shows a cross-sectional view of conventional wire used in filters.

Referring to FIG. 5, there shown a cross-sectional view of the wedge wire 76 as utilized in the filter bayonet 62 present invention. The wedge wire 76 comprises a plurality of wire elements 78. Each of the wire elements 78 has a wide end 80 and a narrow end 82. FIG. 5 shows a coffee particle 84 covering one of the openings between the wire elements 78. As of the coffee particle abuts the wide ends 80 of the wire elements 78, it is much easier to prevent these coffee particles 84 from becoming stuck within the wedge wire 76. Compare this configuration of the wedge wire 76 with the conventional wire filter 86 as shown in FIG. 5A. In the conventional wire filter 86, the wire elements 88 have a round shape, allowing coffee particles 84 to become stuck within the wire filter wire elements 88, making it difficult to unplug the filter elements.

Preferably, for the first filter bayonet, the wide ends 80 of the wedge wire 76 face outwardly of first filter bayonet 42 into the interior of the extraction tanks 32. Conversely, for the second filter bayonet 44, the narrow ends 82 preferably face outwardly of the filter bayonet 44 into the interior of the extraction tank 32. Of these designs, both reduce flow and prevent plugging within the filters. Due to the design of the filter bayonets, and given the fact that the system of the present invention operates under pressure, a finer grind of coffee beans is used as compared to conventional process. This finer grind helps to increase contact surface and improve extraction rates.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An extraction system for cold brew coffee comprising:
   a plurality of extraction tanks connected in series, each of said plurality of extraction tanks having an interior volume adapted to receive ground coffee beans therein and a back pressure control valve connected thereto, said back pressure control valve adapted to control water pressure in the respective extraction tank; each of said plurality of extraction tanks comprising:
      a loading valve on a top of the extraction tank;
      a discharge valve on a bottom of the extraction tank;
      a first filter bayonet positioned in a fluid inlet of the extraction tank; and
      a second filter bayonet positioned in a fluid outlet of the extraction tank, each of said first filter bayonet and said second filter bayonet comprising wedge wire having a wide end and a narrow end;
   a water tank; and
   a pump connected to said water tank and to said plurality of extraction tanks.

2. The extraction system of claim 1, said plurality of extraction tanks comprising a first set of extraction tanks connected in series and a second set of extraction tanks connected in series, said pump connected to said first set of extraction tanks, the system further comprising:
   another pump connected to said water tanks and to said second set of extraction tanks.

3. The system of claim 1, said wide end of said wedge wire of said first filter bayonet facing outwardly of said first filter bayonet into the extraction tank, said wide end of said wedge wire of said second filter bayonet facing inwardly of said second filter bayonet.

4. The system of claim 1, each of said plurality of extraction tanks having a height to diameter ratio of approximately 7.5.

* * * * *